(12) United States Patent
Schmitt et al.

(10) Patent No.: US 11,194,024 B2
(45) Date of Patent: Dec. 7, 2021

(54) LIDAR ARRANGEMENT AND LIDAR METHOD

(71) Applicant: Airbus Defence and Space GmbH, Taufkirchen (DE)

(72) Inventors: Nikolaus Schmitt, Taufkirchen (DE); Thorsteinn Halldorsson, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 613 days.

(21) Appl. No.: 16/034,113

(22) Filed: Jul. 12, 2018

(65) Prior Publication Data
US 2019/0018115 A1   Jan. 17, 2019

(30) Foreign Application Priority Data

Jul. 12, 2017  (DE) .......................... 102017115710.7

(51) Int. Cl.
*G01S 7/481*      (2006.01)
*G01S 7/484*      (2006.01)
(Continued)

(52) U.S. Cl.
CPC ............ *G01S 7/4863* (2013.01); *G01S 7/484* (2013.01); *G01S 7/486* (2013.01); *G01S 7/4815* (2013.01);
(Continued)

(58) Field of Classification Search
CPC ...... G01S 7/4863; G01S 7/486; G01S 7/4815; G01S 17/95; G01S 7/4816; G01S 17/42;
(Continued)

(56) References Cited

U.S. PATENT DOCUMENTS 5,530,582 A * 6/1996  Clark ................... H04B 10/291
                                                       359/333
6,320,651 B1  11/2001 Manhart et al.
(Continued)

FOREIGN PATENT DOCUMENTS

CN     103885065 A    6/2014
DE        3544558     1/1997
(Continued)

OTHER PUBLICATIONS

"Telescope", definition from Dictionary.com, downloaded May 23, 2021, 9 pages. (Year: 2021).*
(Continued)

*Primary Examiner* — Daniel L Murphy
(74) *Attorney, Agent, or Firm* — Greer, Burns & Crain, Ltd.

(57) ABSTRACT

A LIDAR arrangement comprising a laser transmitter for transmitting pulses of a laser radiation to a measurement object, and a receiver for receiving pulses of the laser radiation backscattered from the measurement object, wherein the laser transmitter is configured to transmit a pulse sequence in which successive pulses respectively comprise a particular optical frequency shift to each other and wherein the receiver either includes a dispersive element for separating the pulses in time depending on the optical frequency by a frequency-based deflection, and a position resolution optical matrix transmitter on which the pulses separated in time by the dispersive element are mapped, or includes a frequency analyzer for the frequency-based separation of the pulses by superimposition with a reference radiation.

19 Claims, 5 Drawing Sheets

(51) Int. Cl.
  *G01S 7/486* (2020.01)
  *G01S 17/10* (2020.01)
  *G01S 17/58* (2006.01)
  *G01S 7/4863* (2020.01)
  *G01S 17/95* (2006.01)
  *G01S 17/42* (2006.01)
  *G01S 17/26* (2020.01)

(52) U.S. Cl.
  CPC .......... *G01S 7/4816* (2013.01); *G01S 7/4817* (2013.01); *G01S 17/10* (2013.01); *G01S 17/26* (2020.01); *G01S 17/42* (2013.01); *G01S 17/58* (2013.01); *G01S 17/95* (2013.01)

(58) Field of Classification Search
  CPC ........ G01S 17/26; G01S 7/4817; G01S 7/484; G01S 17/10; G01S 17/58
  USPC ...................................................... 356/5.01
  See application file for complete search history.

(56) References Cited

U.S. PATENT DOCUMENTS

| | | | |
|---|---|---|---|
| 8,159,680 | B2 | 4/2012 | Robinson et al. |
| 9,335,414 | B2 | 5/2016 | Leyva |
| 2001/0005263 | A1 | 6/2001 | Fabre et al. |
| 2006/0238742 | A1 | 10/2006 | Hunt et al. |
| 2007/0171397 | A1 | 7/2007 | Halldorsson |
| 2008/0190192 | A1 | 8/2008 | Bommier et al. |
| 2009/0310118 | A1 | 12/2009 | Halldorsson |
| 2011/0181864 | A1 | 7/2011 | Schmitt et al. |
| 2011/0188029 | A1 | 8/2011 | Schmitt et al. |
| 2012/0194823 | A1 | 8/2012 | Moore et al. |
| 2013/0050676 | A1 | 2/2013 | d'Aligny |
| 2013/0110326 | A1 | 5/2013 | Kelm |
| 2015/0022820 | A1* | 1/2015 | Holzapfel .......... G01B 9/02019 356/482 |
| 2016/0011312 | A1 | 1/2016 | Leyva |
| 2016/0291137 | A1 | 10/2016 | Sakimura et al. |
| 2017/0168162 | A1 | 6/2017 | Jungwirth |

FOREIGN PATENT DOCUMENTS

| | | |
|---|---|---|
| DE | 19913049 | 10/2000 |
| DE | 102008025825 | 12/2009 |
| DE | 102010005167 | 7/2011 |
| DE | 102010022673 | 12/2011 |
| DE | 102015222061 A1 | 5/2017 |
| EP | 1111908 | 6/2001 |
| EP | 1152260 | 11/2001 |
| EP | 1553427 | 7/2005 |
| EP | 2634597 | 9/2013 |
| EP | 3179273 A1 | 6/2017 |
| WO | 2004092767 | 10/2004 |
| WO | 2006103325 | 10/2006 |
| WO | 2007009759 | 1/2007 |
| WO | 2010000751 | 1/2010 |
| WO | 2010000754 | 1/2010 |
| WO | 2011138544 | 11/2011 |

OTHER PUBLICATIONS

German Search Report, dated Jul. 12, 2017, priority document.
https://airbusdefenceandspace.com/our-portfolio/space-systems/earth-observation-satellites/esa-pefererred-partner/aeolus/—Link not available anymore.
http://www.airbusgroup.com/int/en/news-media/press-releases/20070604_astrium_aladin.html—Link not available anymore.
http://www.esa.int/Our_Activities/Observing_the_Earth/The_Living_Planet_Programme/Earth_Explorers/ADM-Aeolus/Payload.
http://www.esa.int/web/guest/missions/esa-future-missions/earthcare—Link not available anymore.
European Search Report for corresponding European Patent Application No. 18182834.4.
Ewan S. Douglas, et al., DWEL: A Dual-Wavelength Echidna Lidar for Ground-Based Forest Scanning, pp. 4998-5001, 2012.

* cited by examiner

LIDAR ARRANGEMENT AND LIDAR METHOD

CROSS-REFERENCES TO RELATED APPLICATIONS

This application claims the benefit of the German patent application No. 10 2017 115 710.7 filed on Jul. 12, 2017, the entire disclosures of which are incorporated herein by way of reference.

BACKGROUND OF THE INVENTION

The invention relates to an arrangement and a method for LIDAR detection, in the following referred to as LIDAR arrangement and LIDAR method.

Today, pulsed laser transmitters are used in many applications to represent the spatial distribution of particular targets along the propagation direction of the laser beam. Similar to RADAR and SONAR, the backscattering or echo of a pulse is here received and recorded through a medium such as a vacuum, air or water using a corresponding photo receiver installed next to the transmitting station. The distance of the target is then obtained as a product of the runtime to the target and back and of the speed of light in the medium. The very narrow spectral width of a laser additionally allows, similar to RADAR and SONAR, to measure the speed of the target along the beam axis from a frequency shift of the received signal against the optical frequency of the transmission beam—i.e., Doppler shift. Measuring arrangements of this kind are referred to as LIDAR or Light Detection And Ranging.

For prior art concerning LIDAR arrangements, components and advantageous uses thereof, reference is made to WO2004092767A1, WO2006103325A1, WO2007009759A1, WO2010000751A1, WO2010000754A1, WO2011138544A2, EP1111908A1, EP1152260B1, EP1553427B1, EP2634597A1, DE19913049A1, DE102008025825B4, DE102010005167A1, DE102010022673A1, and DE102014005181A1.

A particularly preferred use of the invention relates to satellite-based LIDAR arrangements and LIDAR methods, particularly for meteorological purposes such as wind detection. Most relevant prior art in this respect is the WIND-LIDAR "ALADIN" of the company of Astrium used on the satellite Aeolus, see https://airbusdefenceandspace.com/our-portfolio/space-systems/earth-observation-satellites/esa-pefererred-partner/aeolus/
and
http://www.airbusgroup.com/int/en/news-media/press-releases/20070604_astrium_aladin.html
and
http://www.esa.int/Our_Activities/Observing_the_Earth/The_Living_Planet_Programme/Earth_Explorers/ADM-Aeolus/Payload;
as well as
the satellite EarthCARE (Earth Clouds, Aerosols and Radiation Explorer) of ESA and the Japanese Space Agency JAXA with the atmosphere backscattering LIDAR ATLID (Atmospheric Lidar), see
http://www.esa.int/web/guest/missions/esa-future-missions/earthcare.

SUMMARY OF THE INVENTION

The invention is based on an object of providing a LIDAR arrangement and a LIDAR method with a higher laser repetition rate, preferably also of a kind that permits scanning transversely to the motion direction of the LIDAR arrangement and/or enables a compact design.

In a first aspect, the invention provides a LIDAR arrangement comprising a laser transmitter for transmitting pulses of a laser radiation to a measurement object, and a receiver for receiving pulses of the laser radiation backscattered from the measurement object, wherein the laser transmitter is configured to transmit a pulse sequence in which successive pulses respectively comprise a specific frequency shift to each other and wherein the receiver 1.1 includes a dispersive element for the spatial separation of the pulses depending on the optical frequency by a frequency-dependent deflection, and a spatial resolution optical matrix sensor on which the pulses spatially separated by the dispersive element are mapped (direct reception) or 1.2 includes a frequency analyzer for a frequency-based separation of the pulses by superimposition with a reference radiation (superheterodyne reception).

Hence, according to a first alternative (in particular, for direct reception), the invention provides a LIDAR arrangement comprising a laser transmitter for transmitting pulses of a laser radiation to a measurement object, and a receiver for receiving pulses of the laser radiation backscattered from the measurement object, wherein the laser transmitter is designed for transmitting a pulse sequence in which successive pulses respectively comprise a specific frequency shift to each other and wherein the receiver includes a dispersive element for a spatial separation of the pulses depending on the optical frequency by a frequency-based deflection, and a spatial resolution matrix sensor on which the pulses spatially separated by the dispersive element are mapped.

According to a second alternative, a LIDAR arrangement is provided comprising a laser transmitter for transmitting pulses of a laser radiation to a measurement object, and a receiver for receiving pulses of the laser radiation backscattered from the measurement object, wherein the laser transmitter is designed for transmitting a pulse sequence in which successive pulses respectively comprise a specific optical frequency shift to each other and wherein the receiver includes a frequency analyzer for the frequency-based separation of the pulses by superimposition with a reference radiation.

Preferably, the laser transmitter is configured to transmit pulses with a pulse frequency of 1 kHz to 1 MHz, preferably of 2.5 kHz to 900 kHz, even more preferably of 10 kHz to 200 kHz.

Preferably, the laser transmitter includes a master oscillator selected from a group comprising a master oscillator including a number of lasers, in particular diode lasers or micro solid-state lasers of different wave lengths, a master laser that can be directly modulated in its wave length, and a combination of a master laser and a downstream modulator for modulating the wave length of the master laser.

Preferably, the laser transmitter includes one or more optical amplifiers for amplifying a signal from a master oscillator.

Preferably, the laser transmitter includes one or more optical amplifiers for amplifying a signal from a master oscillator preferably composed of one or more fiber amplifiers.

Preferably, the laser transmitter includes a frequency multiplier preferably arranged downstream of the amplifier or fiber laser.

Preferably, the laser transmitter includes a transmission telescope.

Preferably, the laser transmitter includes a scanner for scanning an angular range with the radiation from the laser transmitter.

Preferably, the dispersive element includes one or several elements from the group comprising a grating, a prism, a Fabry-Pérot interferometer, a fiber-optical de-multiplexer, a reconfigurable fiber-optical multiplexer, and an arrayed waveguide grating.

Preferably, the matrix sensor is selected from the group comprising a one-dimensional matrix sensor, a two-dimensional matrix sensor, a photo detector array, a one-dimensional photo detector array, a two-dimensional photo detector array, a CCD array, a one-dimensional CCD array, a two-dimensional CCD array, a PIN detector array, a one-dimensional PIN detector array, a two-dimensional PIN detector array, a CMOS array, a one-dimensional CMOS array, a two-dimensional CMOS array, a CMOS APD array, a one-dimensional CMOS APD array, a two-dimensional CMOS APD array, an ICCD detector, a one-dimensional ICCD detector, a two-dimensional ICCD detector, an EMCCD array, a one-dimensional EMCCD array, a two-dimensional EMCCD array, an IBCCD array, a one-dimensional IBCCD array, a two-dimensional IBCCD array, an EMCMOS array, a one-dimensional EMCMOS array, a two-dimensional EMCMOS array, an IBCMOS array, a one-dimensional IBCMOS array, and a two-dimensional IBCMOS array.

Preferably, the frequency analyzer comprises a photo detector and a device for superimposition of a received radiation with a reference radiation on the photo detector, wherein the photo detector is designed for outputting a signal having a differential frequency corresponding to the difference between the frequencies of a received radiation and a reference radiation.

Preferably, the receiver comprises an interferometer between the dispersive element and the matrix sensor, for mapping at least partially spatially separated interferograms to the individual pulses of the pulse sequence on the matrix sensor.

Preferably, the receiver comprises an A/D converter for converting signals from pixels of the matrix sensor.

Preferably, the receiver comprises an intermediate register for buffering signals from pixels of the matrix sensor.

Preferably, the receiver comprises a synchronization device for synchronizing the reading and/or for further processing signals to be assigned to different pulses of the received signals over time.

Preferably, the receiver comprises a receive telescope.

Preferably, the receiver comprises a light guide device for receiving radiation from different directions from the measurement object and for introducing the radiation into the dispersive element from different directions at different angles or at spatially offset locations.

In a further aspect, the invention relates to a LIDAR method for measuring the location and/or velocity of a measurement object, comprising:

emitting to the measurement object a series of pulses of a laser radiation, wherein successive pulses respectively comprise a particular frequency shift to each other, receiving pulses backscattered from the measurement object and a) spatial separation of the pulses depending on their optical frequency and corresponding spatially separated mapping on a matrix sensor and detecting the position of the mapping of the received pulses on the matrix sensor or b) performing a frequency analysis of the received pulses for a frequency-based separation of the pulses by superimposition with the reference radiation.

Preferably, the pulses are transmitted with a pulse frequency of 1 kHz to 1 MHz, preferably of 2.5 kHz to 900 kHz, even more preferably of 10 kHz to 200 kHz.

Preferably, the pulses having a different frequency are generated in a master oscillator and are subsequently amplified by means of at least one fiber amplifier.

Preferably, after being amplified, the pulses are converted with respect to their optical frequency and are especially multiplied with respect to their optical frequency, particularly by optically non-linear media.

Preferably, interferograms locally separated, at least partially, are generated by an interferometer to the pulses locally divided corresponding to their frequency and are mapped on the matrix sensor.

Preferably, the method comprises scanning the transmitted pulses over an angular range and receiving the backscattered pulses within an angular range and spatially separated mapping of pulses received from different angles on the matrix sensor.

Preferably, step b) comprises the superimposition of the received pulses with a reference radiation, forming a differential frequency between the received pulse and the reference radiation, and further processing the differential frequency.

Particularly, the invention relates to a method and an arrangement for the separate measurement of LIDAR signals superimposed in time.

The invention and/or advantageous embodiments of the invention create an improvement of the LIDAR technology which makes it possible to separate and individually measure reception signals of a pulsed transmission radiation of very high transmission frequency in the receiver—despite their overlap in time, which occurs as a consequence of a long pulse transit time through the scanned medium, for example, at the measurement of the earth's atmosphere from a satellite.

According to the invention, a method and an arrangement for LIDAR detection at high repetition rates are provided.

The invention is particularly suitable for applications in air and space travel, especially for an improved satellite-based wind LIDAR.

Satellite LIDARS as previously implemented in the field, achieve only a low repetition rate of 2.5 kHz, typically about 100 Hz, at maximum.

LIDARs with high repetition rates such as enabled by the present invention, allow the use of the very compact and stable fiber laser technology. Unfortunately, this interesting fiber technology only permits a low pulse power and hence only a relatively low pulse energy. This can be compensated by a higher repetition rate. On the other hand, a higher repetition rate may lead to ambiguities in the pulse detection, which in turn lead to that high repetition rates cannot be used for very long measuring ranges, as it would be the case in altitudes above the atmosphere. The advantageous embodiments of the invention herein described also allow the use of fiber lasers for space LIDARs such as satellite-based LIDARs.

In current atmospheric LIDAR systems, which detect wind speeds in the atmosphere from satellites, a laser beam is sent to the atmosphere and is backscattered, and the backscattered light, which is frequency shifted due to the Doppler effect, is received by the satellite. Due to the runtime, the atmospheric height of the backscatter can be resolved. Two main principles can be applied:

1) direct detection in which the Doppler shift is determined by a relative wave length shift measurement using for instance a Fabry-Pérot interferometer or the like and 2) coherent techniques in which the Doppler shift can be directly obtained from the beat signal from the received light and the emitted light.

As the atmosphere has a height in the range of 30 km, the laser pulse runtime through the atmosphere is about 180 μs. In case the pulse repetition frequency of the measurement is above 5 kHz, the height at which a particular backscattering signal strength is achieved cannot be resolved anymore due to ambiguity of overlapping pulses.

Concerning the basic principle for example, embodiments of the invention work in the same way as the current LIDAR systems and are therefore able to detect wind speeds or speeds of other measurement objects via a measurement of the Doppler shift according to one of the above-mentioned main principles 1) or 2) when designed as a Doppler LIDAR. According to embodiments of the invention, to achieve unambiguity at atmospheric wind LIDAR detections, the pulses emitted by the laser are additionally wave length coded or frequency coded. For example, successive pulses are modulated in such a manner that they have different wave lengths (wave length division multiplexing—WDM) or different frequencies.

Particularly preferably, in the case of WDM, the received pulses are not separated by a wave length splitter, as usual in communication and measurement techniques, but are delivered in a manner identical with a Fabry-Pérot interferometer (briefly referred to as FP interferometer or FPI, or alternatively also a different interferometer, e.g., of the type Fizeau), which is used for the determination of the Doppler shift induced by the wind speed. The Fabry-Pérot interferometer is preferably designed in such a manner that the free spectral range is greater than the Doppler frequency shift plus n times the wave length shift of the multiplex pulse channels (n being the number of the multiplex channels).

Preferably, when using interference fringe technologies, it is possible not only to determine a fringe displacement corresponding to the Doppler shift, but also to additionally sort the pulses by time, which—due to the run length that corresponds to the light speed—corresponds to atmospheric heights, and therefore the pulses are sorted according to the atmospheric height.

In this manner, the problem of ambiguity in high repetition atmospheric LIDAR wind speed detection without additional channel splitting at the receiving end (which would require a separate receiver for each wave length channel) can be solved with a single Fabry-Pérot receiver that is anyway needed for the determination of the Doppler shift of an individual channel. The only additional effort is the right design of the Fabry-Pérot receiver as described above.

Similarly, when using the frequency multiplex technique, subsequent pulses are shifted in frequency by an amount greater than the Doppler-shifted reception signal. Using a Fast Fourier Transform (FFT) or a filtering process after a coherent receiver again enables sorting of the pulses according to time and hence according to the atmospheric heights.

Accordingly, the above-described configuration of the receiver and the use of a shift in wave length or frequency of successive pulses make it possible for the first time to employ fiber lasers or fiber amplifiers having a high repetition rate for LIDAR systems at repetition rates substantially above 5 kHz, which currently is the measuring limit for space LIDAR arrangements or methods involving atmospheric height resolution.

The use of fiber lasers and/or fiber amplifiers is a key factor for enabling future LIDAR systems in space, which are extremely stable, efficient and miniaturized and which allow height-resolved wind speed measurements for greatly improved meteorological forecasts.

Preferred embodiments of the invention relate to a method and/or an arrangement for separating LIDAR signals having a high transmission pulse frequency with an overlap in time of the reception signals due to the long runtime through the scanned medium.

Preferably, a periodic optical frequency shift (wave length shift) of adjacent transmission pules is performed.

Preferably, in case of a direct reception technique, a spatial separation takes place on the receiver side by a dispersive element depending on the wave length of the different individual laser pulses.

Preferably, the laser pulses are then mapped on a suitable one or two-dimensional photo detector array at at least partially different locations.

Preferably, the spatially separated signals are supplied to an interferometer at different positions and/or different angles such that at the output of the interferometer at least partially separated interferograms to the individual spatially separated frequency-shifted laser pulses are produced which are recorded by means of a one or two-dimensional photo detector array.

Preferably, the photo detector signals of the individual pixels are read into an intermediate register via an analog-to-digital converter, and buffering and read-out thereof for further digital processing are synchronized in the timing of the incoming signals.

Preferably, a number of lasers (array) of different wave length (for example laser diodes), which are coupled into a common optical fiber, are used as a master laser.

Preferably, the radiation of the master laser is amplified in power by a common fiber amplifier.

Preferably, the amplified laser radiation is frequency converted by using non-linear optical media, for example.

Preferably, the wave lengths of the master lasers correspond to a portion of the internationally standardized wave lengths for use in wave length division multiplexing systems.

Preferably, a master laser is used that can be directly modulated in its emission wave length.

Further preferably, in this case, the master laser is modulated in its emission wave length by a current modulation, a temperature modulation or the change of a frequency-selective element of the same (e.g., a Bragg reflector), by an introduction of stress onto the laser crystal or a combination thereof.

Preferably, the output radiation of the master laser is changed by means of a downstream electro-optical or acousto-optical modulator.

Preferably, a grating, a prism, a Fabry-Pérot interferometer, a fiber-optical de-multiplexer (OADM), a reconfigurable fiber-optical multiplexer (ROADM) or an arrayed waveguide grating (AWG) are used as a dispersive element for spatially separating the individual laser wave lengths of the emitted laser pulses.

Preferably, a Fabry-Pérot interferometer or a Fizeau interferometer are used as an interferometer.

Preferably, the coupling of the spatially separated wave lengths of the received laser radiation into the dispersive element takes place in an arrangement of a line, a circle or in any other two-dimensional arrangement of light rays.

Preferably, the image position of the optical radiation of the individual laser pulses behind the interferometer corresponds to a circular pattern in the case of a Fabry-Pérot interferometer or to a line pattern in the case of a Fizeau interferometer.

Preferably, a linear or two-dimensional arrangement of photo detectors is used as a detector array.

Preferably, an array from the group comprising a one or two-dimensional CCD array, a PIN detector array, a CMOS array, a CMOS APD array, an ICCD detector, an EMCCD array, an IBCCD array, an EMCMOS array or an IBCMOS array is used as a photo detector array.

Preferably, the LIDAR reception signals read into the intermediate register are read-out in parallel or serially in a time cycle with the timing of the LIDAR reception signals for further electronic processing.

Further preferred embodiments of the invention relate to a method and/or an arrangement for the measurement of high rate and/or time-overlapped multiple LIDAR signals by means of a detector system having a low readout rate, the laser repetition rate $F_{laser}$ of the LIDAR system being clearly greater than the inverse of the runtime of the laser pulses through the medium to be measured.

In this case, it is preferred that the laser repetition rate $F_{laser}$ of the LIDAR system is as high that the resulting backscattering overlaps in time and does not permit an unambiguous assignment in time of the received signal to the number of the emitted laser pulses, wherein the laser pulses emitted within the time T are respectively assigned to different laser frequencies using suitable frequency modulation methods, wherein further, in the case of direct reception, the signals overlapping in time are spatially separated and are detected by a detector array or in the case of a heterodyne reception the signal is, after the reception of the backscattered laser pulses by a photo detector, subsequently subjected to a frequency analysis such that the individual laser pulses are separated in frequency at this frequency analysis such that the fast pulse sequence of the laser pulses can be unambiguously assigned by means of frequency-based separation in the frequency analyzer and the unambiguous overlap of the received signals can be unambiguously resolved.

In this case, it is preferred to use a master laser that can be directly modulated in its emission wave length.

Further preferably, the master laser is modulated in its emission wave length using a current modulation, a temperature modulation or by the change of a frequency-selective element of the same (e.g., a Bragg reflector) or a combination thereof.

Preferably, the output radiation of the master laser is changed by means of a downstream electro-optical or acousto-optical modulator.

Preferably, a PIN diode, an APD diode or a receiver composed of several such diodes is used as a photo detector.

Preferably, the frequency-based separation of the signals takes place using a Fourier analysis (e.g., FFT) or one or several filters.

Preferably, the LIDAR signals are received from an angle that is fixed with respect to the LIDAR system.

Preferably, the LIDAR signals are received from several angles or angle ranges that can be switched in terms of time or can be continuously changed (scan).

BRIEF DESCRIPTION OF THE DRAWINGS

Embodiments of the invention will now be described in more detail with reference to the attached drawings. In the drawings it is shown by.

DETAILED DESCRIPTION OF THE PREFERRED EMBODIMENTS

FIGS. 3 through 9 show different embodiments of LIDAR arrangements 10, the basic functions and advantages of which will first be described in more detail with reference to FIGS. 1 and 2. The LIDAR arrangements 10 can be used in many applications to represent the spatial distribution of particular targets along the propagation direction of a laser beam. Particular attention is paid to the suitability of the LIDAR arrangement 10 for atmospheric LIDAR measurements, especially for meteorological measurements of the atmosphere. In particular, the LIDAR arrangement 10 is designed for use on or in satellites or space stations or other aerospace objects.

A sectional image can be obtained using single-axle scanning of the transmission and receiving axes of a stationary LIDAR during the emission of a laser pulse series. This sectional image is also created without scanning, if the LIDAR device is in a smooth motion on a plane or in a satellite. Here the LIDAR leaves a series of parallel scanning tracks with measurement recordings in the direction toward the ground. By additionally scanning the transmission and receiving axis over a fixed angle transversely to the moving direction, the ground or the atmosphere can be scanned over a particular angular range even two-dimensionally or three-dimensionally.

LIDARs are used for various measurement tasks using laser wave lengths in the entire wave length range from UV through IR. These tasks are generally divided into two categories: LIDAR measurements to solid targets or to soft targets. Distance, profile and area measurements to solid objects belong to the first category. Some examples are: LIDAR scanning in autonomous driving of a vehicle for recording obstacles; LIDAR scanning from aircraft, which enables a sight with the focused laser beam through gaps in the forest cover to the ground, in the service of vegetation research and archaeology; LIDAR measurements from the satellite, which produce accurate height profiles of the surface of the planets, i.e., Mars, Mercury and the moon, for planetary research.

To the second category of soft targets belong LIDAR measurements of the distribution of air aerosols in clear weather, mist, fog, cloud and individual gas constituents and of their motion from their Doppler shift in the reception signal, for meteorological observation and atmospheric research. Such measurements are respectively made from ground stations, aircraft or satellites. In contrast to solid targets, where exclusively the sharp echoes are important and reflect the contours of and the distance from objects, in soft targets the continuous intensity profile of backscatter is recorded to derive the concentration of the atmosphere constituents along the beam axis from this profile. In Doppler LIDARs, wind speeds are recorded by additionally measuring the progress of the Doppler frequency shift in the projection onto the beam axis.

"Snapshots on one axis" are taken with individual transmission pulses during the short period of their runtime. Today, the airplane or the satellite uses a pulse frequency of about 100 Hz to obtain, in a series of vertical snapshots, a sectional image along the trajectory through the atmosphere.

On the other hand, transmission frequencies higher than 1 kHz enable a better spatial resolution in the sectional images and, last but not least, scanning transversely to the trajectory. However, at a higher pulse frequency, account has to be taken that when a single photo receiver is used for all signals, there may be caused an overlap in time of the received measurement signals of different pulses, meaning that each received signal can no longer be unambiguously assigned to individually emitted transmission pulses in the pulse series.

The limit of the measurement frequency until such overlap occurs is determined by the ratio of the runtime of the transmission pulse to the expanse of the measuring section L in both solid and soft targets. When the distance in time of the transmission pulse $T_s$ of the frequency $F_s=1/T_s$ is considerably greater than the runtime $T_L=2L/c$ there and back, with c being the light speed, i.e., $T_s \gg T_L$, the echoes from solid discrete objects of category 1 in different unknown distances on the measuring section of a particular transmission pulse $P_n$ can still be unambiguously differentiated from those of a subsequent transmission pulse $P_{n+1}$ because their distance in time will then always be $$(T_{s/n+1}-T_{s/n}) \gg T_L,$$

i.e., all measurement signals of $P_{n+1}$ on the measuring section arise completely separate from the measurement signals of $P_n$ in terms of time.

However, this is not the case when the time interval of the pulses is equal to the pulse runtime over the expanse of the measuring section, i.e., $$(T_{s/n+1}-T_{s/n})=T_L.$$

Because in this case, the echo of an object as it is received by the photo receiver can be either interpreted as an echo of the pulse $P_n$ of an object at the end of the measuring section or of a subsequent pulse $P_{n+1}$ at the beginning of the measuring section, because both arrive at the receiver at the same time. This means that an overlap is produced at the receiver which also applies to each pair of adjacent transmission pulses in the pulse series.

Now, if the time interval of adjacent pulses is shorter than the measured expanse, i.e., $$(T_{s/n+1}-T_{s/n})<T_L,$$

the overlapping region of these two pulses shifts from the edge towards the center of the measuring range and there are produced around its center intervals of this overlap of more distant pulses and closer pulses.

If the time interval is $$(T_{s/n+1}-T_{s/n})<T_L/2,$$

the ambiguity range even extends to the pulses $P_{n-1}$ and $P_{n+2}$, meaning that it leads to an overlap in time over an increasing number of adjacent pulses if the pulse spacing further decreases.

The above description relates to the possible overlap of echoes of several discrete solid targets at a high transmission frequency. The same also applies to measurements to soft targets, because these can be regarded as a tight juxtaposition of discrete semipermeable targets. With soft targets such as the earth atmosphere, this overlap of the received signals leads to a serious problem in a single receiver which has not been solved up to present. Namely, in this case, unambiguous recording of the relative intensity of the backscatter from the atmosphere or, in the case of the Doppler LIDAR, of the frequency shift in any position along the measuring section is desired.

The overlap in time of the signal components of the backscatter of several adjacent transmission pulses occurring at a high transmission frequency here leads to a radical distortion of the measurement results.

The LIDAR arrangements 10 as proposed and the LIDAR methods that can be carried out using these arrangements shall enable a separation of the received signals, i.e., a recovery of their correct assignment to the individual transmission pulses and thus their measurement despite this overlap.

The limit of the pulse spacing of the transmitter beyond which the ambiguity of the measurement occurs is different for different LIDAR applications. This is due to the different measured expanses. For example, in ground measurements or in measurements of the atmosphere from the aircraft with the measured expanse being L=10 km, the limit of the pulse spacing $$T_{Limit}=2L/c=20 \text{ km}/3 \times 10^5 \text{ km/sec}=0.66 \times 10^{-5} \text{ sec}.$$

and the limit frequency then is $$F_{Limit}=1/T_{Limit}=15 \text{ kHz}.$$

Further, at typical measured expanses of the atmosphere from a satellite of L=30 km, for example, the limit frequency is $$F_{Limit}=5 \text{ kHz}.$$

Figure 1A:
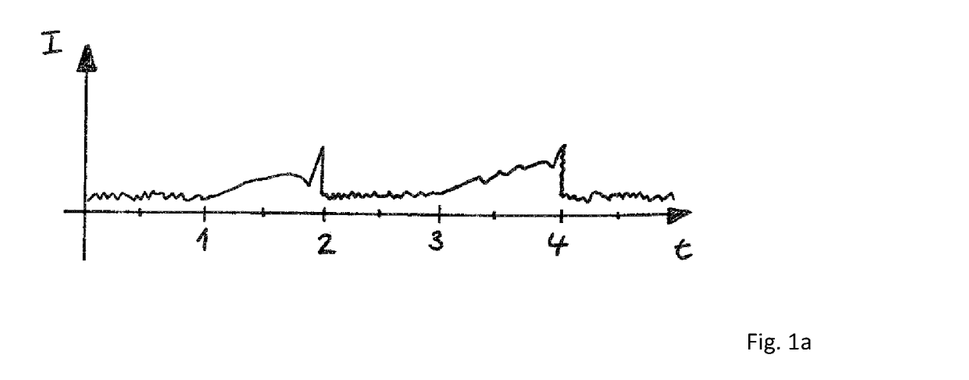
FIG. 1a shows a measurement signal of a receiver of a satellite atmospheric LIDAR in a case where the transmission frequency is only half of the measurement frequency.
Figure 1B:
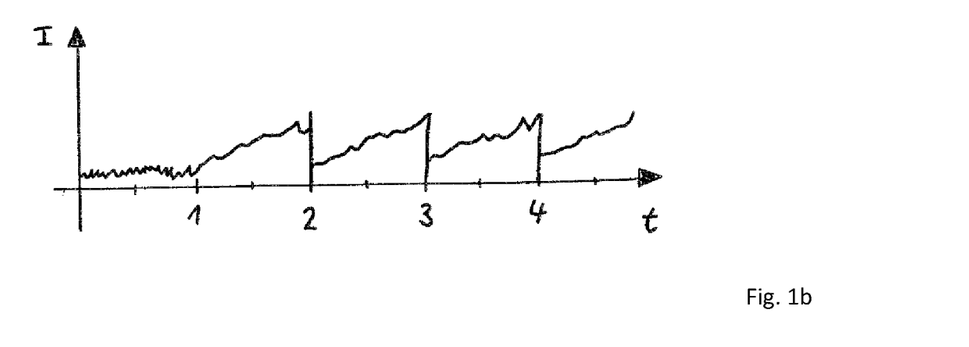
FIG. 1b shows a measurement signal of a receiver of a satellite atmospheric LIDAR in a case where the transmission frequency is equal to the measurement frequency.
Figure 1C:
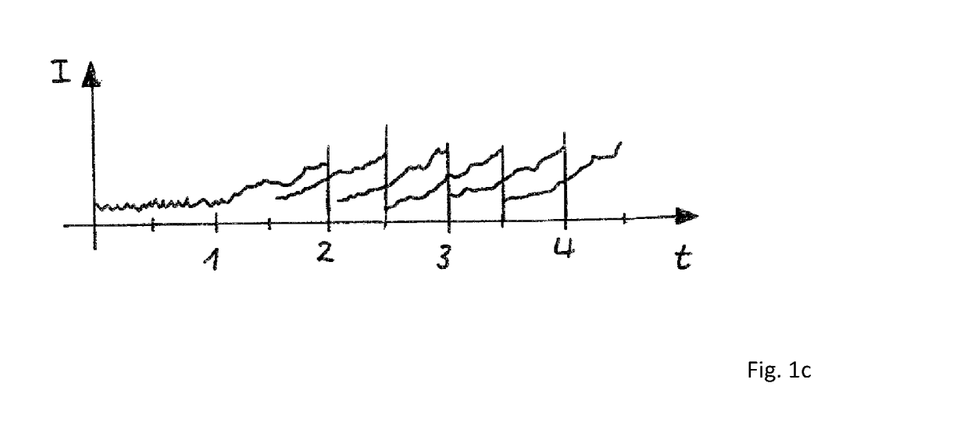
FIG. 1c shows a measurement signal of a receiver of a satellite atmospheric LIDAR in a case where the transmission frequency is two times higher than the measurement frequency.

FIG. 1 shows this effect for use of atmospheric measurements from the satellite, which is in the foreground here as an application of the LIDAR arrangement 10.

FIG. 1 shows the measured signal I of a receiver of a satellite atmospheric LIDAR in the case where a) the transmission frequency is only half of the measurement frequency (FIG. 1a), b) the transmission frequency is equal to the measurement frequency (FIG. 1b) and c) the transmission frequency two times higher than the measurement frequency (FIG. 1c).

In FIG. 1, in all the time periods, n=1, 2, 3, 4 . . . $T_{n,n+1}=T_L=2L/c$ with the measurement frequency $F_L=1/T_L$, where L indicates the level above the ground. The various sub-FIGS. 1a, 1b and 1c illustrate the above-discussed cases where a) the transmission frequency is lower by one half, b) is equal to and c) is twice the measurement frequency.

In satellite measurements of the atmosphere it may be advantageous or in some cases even necessary to measure, for example on the dayside of the earth, the reflection of the sun over the same time period as the backscatter signal of the laser pulses from the atmosphere to deduce it mathematically at a later time as a natural base rate from the backscatter signal of each of the laser pulses from the atmosphere.

For such cases, there should be introduced between the times of the measurements of the atmospheric signal an equally long time interval, which exclusively serves for the measurement of the background, while the transmission pulse has not yet entered the atmosphere. By these additional measurement intervals prior to each pulse measurement, the limit frequency $F_{Limit}$ in satellite measurements of 5 kHz is cut by half or reduced to 2.5 kHz. This case is shown in FIG. 1a.

The intention is that the LIDAR arrangements herein described are particularly suitable for enabling improved satellite-based measurements. For this reason, there will be first discussed known LIDAR arrangements intended for a similar use.

The satellite ADM (Atmospheric Dynamic Monitoring)—Aeolus of the European Space Agency, ESA, carries a Doppler LIDAR: ALADIN (Atmospheric Laser Doppler Instrument), and the satellite EarthCare (Earth Clouds, Aerosols and Radiation Explorer) of ESA and of the Japanese Space Agency JAXA carries the atmospheric backscatter LIDAR ATLID (atmospheric Lidar). Both LIDAR devices are forerunners of a series of further atmospheric satellite LIDAR devices which are envisaged and which are based on an increasingly improved technology. In both missions, the transmitter is a frequency-tripled Nd:YAG crystal laser having a transmission pulse frequency of 100 Hz or 50 Hz, respectively. With this low transmission pulse frequency, the above-discussed problem of overlap does not yet occur. In ATLID, the measurement object is the height distribution of the aerosol concentration and in ALADIN the height distribution of wind speeds in the east-west direction. In this case, the aim is to provide a LIDAR arrangement 10 capable of delivering more complex and higher resolution sectional images of the atmosphere with a larger surface covering than in the case of known LIDAR arrangements.

Backscattering of the atmosphere partially takes place from the air molecules, the so-called Rayleigh scattering, or from its air particles and water droplets, the so-called Mie scattering. For characterizing this backscattering, one uses the backscattering coefficient β of the relative scattering intensity per meter $(m^{-1})$ and steradian $(sr^{-1})$. As the backscattering coefficient for the Rayleigh scattering in dependence on the wave length of the transmission beam λ is proportional to $\lambda^{-4}$ and proportional to $\lambda^{-1}$ for the Mie scattering, preferably short transmission wave lengths are used for Rayleigh LIDARS—in the case of ATLID and ALADIN the frequency-tripled 355 nm wave length of the Nd:YAG laser (1064 nm) in the UV range. However, at a constant transmission power, the number of laser photons is also reduced proportionally to $\lambda^{-1}$ due to frequency multiplication. Moreover, considerable optical losses have to be expected in frequency multiplication.

In the measurement and further processing of the received signal in the frequency space, attention should be paid to that the optical frequency bandwidth of the transmission signal $\Delta f_L$ is generally dependent on the pulse duration $\Delta t_L$ according to the Fourier relation $\Delta f_L \cdot \Delta t_L = 1$, i.e., with a pulse duration of $\Delta t_L = 1$ ns, the frequency bandwidth is $\Delta f_L = 1$ GHz and with a pulse duration of $\Delta t_L = 10$ ns, the frequency bandwidth $\Delta f_L = 100$ MHz. To avoid a considerable impact of this spread on the measurement signal, the pulse durations with ALADIN and ATLID are 30 ns and 20 ns, respectively, with a bandwidth of 33 MHz and 50 MHz, respectively.

A further effect that should be taken into account for measurements in the frequency space is the Doppler Spread of the received signals due to the statistical proper motion of particles and molecules of the atmosphere. In Mie scattering, i.e., scattering from aerosols, this Doppler frequency spread of the received signal compared to the transmission signal is negligibly small due to their inertia. On the other hand, this spread is considerable in LIDAR measurements of the Rayleigh scattering and is described as a standard deviation of the Doppler profile from the central frequency in dependence of the temperature: $\delta f_D \delta fD = f_L/c \, (kT/m)1/2$, where k stands for the Boltzmann constant, T stands for the temperature in Kelvin, and m stands for the mass of the molecule. At room temperature and at an average mass of the air molecules, it can be assumed that $\delta f_D = 10^{-6}$, i.e., at a UV radiation of λ=0.3 μm with the transmission frequency of $10^{15}$ Hz, $\delta f_D = 1$ GHz.

Figure 2:
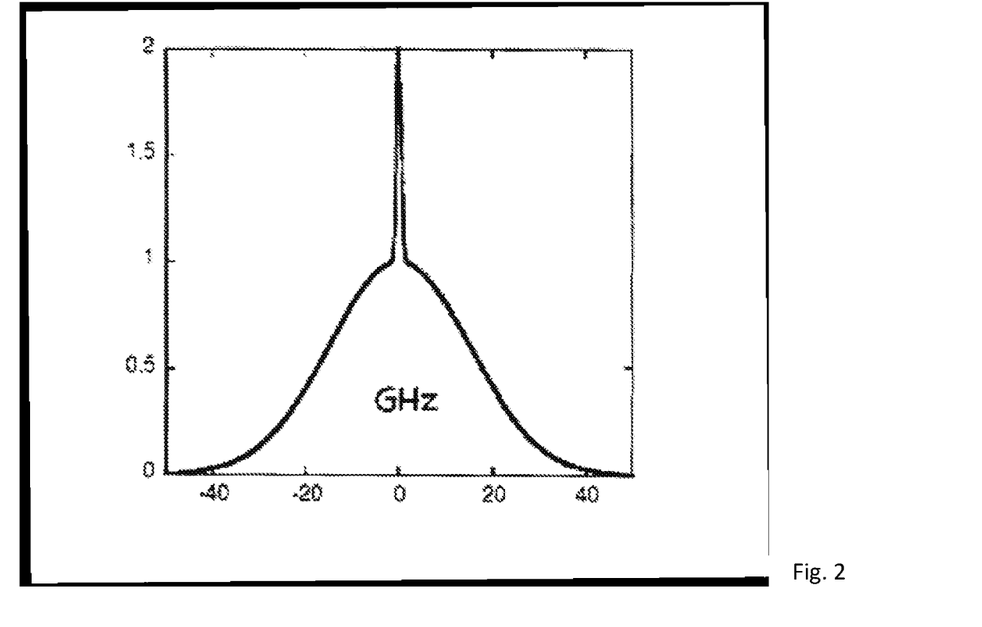
FIG. 2 shows a relative frequency shift of a Mie and a Rayleigh scattering in the atmosphere due to LIDAR measurement.

FIG. 2 shows a relative frequency shift of the Mie and Rayleigh scattering in the atmosphere due to LIDAR measurement.

FIG. 2 schematically shows the reception signal progression as a function of the frequency deviation from the central transmission frequency due to both scatter operations. In both satellites, ALADIN and ATLID, the two scatter components are separated from each other using complex filtering techniques and are individually measured.

The measured single-sided Doppler frequency sweep due to wind in the atmosphere is $$\Delta f_D = 2 f_L v/c,$$

where $f_L$ is the frequency of the laser and v is the wind speed projected in the direction of the receiving axis of the LIDAR. In ALADIN, this is inclined by 35° against nadir. The Doppler frequency shift at a smallest resolved speed of a horizontal wind of u=1 m/s then is $\Delta f_D = 2 \, f_L v/c \cos(90°-35°) = 2 \, v/\lambda \cos(90°-35°) = 3.7$ MHz. The frequency range for the measurement of wind speeds of +/−100 m/s then is 740 MHz.

The LIDAR arrangements 10 herein described enable measurements with considerably higher repetition rates, i.e., in a range of several kilohertz to a range of hundred kilohertz, compared to the satellite missions ALADIN and ATLID. This offers the following advantages:

1) to achieve better averaging through a higher number of pulses, 2) to enable scanning transversely to the satellite path to permit two-dimensional or three-dimensional scanning of the atmosphere;

3) to reduce the pulse peak load of the optical components of the LIDAR that may damage these components;

4) to reduce the risk of damage to the eyes of observers on the ground which is due to the high transmission energy required today and a low repetition rate; and 5) to be able to use low energy lasers with a high repetition rate (e.g., fiber lasers).

Advantageous embodiments of the invention enable considerably higher measurement frequencies $F_{Measurement}$ in LIDARs and particularly in satellite LIDARs as result of the benefits of technological improvements both in the transmission and receiving techniques, despite the above-described problems of a reception signal overlap in individual photo receiver systems and the related limit frequency $F_{Limit}$.

Some preferred embodiments of the LIDAR arrangement and of the LIDAR method provide for:

the use of a high repetition laser configuration (typically up to several 10 kHz, without being limited thereto), which is suitable for operating as a transmitter of a backscattering LIDAR or Doppler LIDAR with the desired high pulse repetition frequency of the measurement $F_{Measurement}$;

enabling the measurement of several LIDAR backscattering signals separated in time and/or spatially separated using a single detector system of which the detection limit frequency (readout rate) is equal to or lower than the repetition rate of the laser used in the LIDAR system;

the separation of diffuse LIDAR backscattering signals overlapping in time due to backscattering from huge distance ranges and hence a time overlap corresponding to the pulse runtimes;

the use of simple detector systems and methods for obtaining unambiguity of the backscattering signals;

the LIDAR's capability of spatial scanning using a single detector system for the measurement of backscatter from different directions;

solutions for a direct and coherent reception.

In the embodiments shown in the FIGS. 3 through 9, a laser transmitter 12 is provided which is constructed in such a manner that it periodically emits in its continuous pulse series over a particular number M of adjacent laser pulses at a measurement frequency (which corresponds to the repetition rate of the laser) $F_{Measurement}$, which is desirably higher than the above-stated limit frequency $F_{Limit}$ at different optical frequencies $f_1$, $f_2$, $f_3$, ... $f_M$ (i.e., colors) at a frequency spacing $\Delta f_n$. Preferably, it is provided at the same time for the overall duration of the period of the emission of these M pulses being longer than the duration between pulses at the limit frequency, i.e., $M/F_{Measurement} \geq 1/F_{Limit}$. This provides for the advantage that the received signals of these M adjacent transmission pulses are always different from each other by their different optical frequency (color) in addition to their mutual time delay (phase difference).

From the basic principle, the receiver 13 and the LIDAR arrangement 10 operate in the same manner as generally described above for LIDAR arrangements; i.e., the receiver 13 operates, for example, in a clocked manner with an exposure time (period) and receives impinging backscattered pulses within the exposure time to measure the distance from the measurement object via the runtime of the individual pulses or to measure a speed of the measurement object via a measurement of the Doppler shift. In addition to this functionality, the receiver 13 is designed, for example, to spatially separate pulses overlapping during the measurement, e.g., incoming pulses per exposure time/clock.

In some illustrated embodiments of the LIDAR arrangement 10, for separating the pulses according to their frequency coding (color), an optical receiving device 14 of the receiver 13 is designed in such a manner that the receiver is equipped with a dispersive optical element 16 (e.g., prism or grating) alone and/or with an interferometer 18 (e.g., Fizeau or Fabry-Pérot), which maps the received signals having a different frequency in a spatially separated manner on a matrix sensor such as a photo detector array 36 (1D or 2D).

Optical reception signals, which overlap in time due to the short time interval of the transmission pulses, are spatially unbundled through this measure and can then be converted in their pixels first in an analog-to-digital (A/D) manner after their mapping on the photo detector array 36 (1D or 2D) to be then read individually into an intermediate register, for example, where they are available for further serial/digital signal processing.

After a period of the frequency shift of the pulses (i.e., after M pulses), received signals arise in the subsequent period in the same frequency series and are therefore spatially deflected in the same manner onto the photo detector array 36 by the dispersive element 16. However, in this case there is a time difference $M/F_{Measurement}$ greater than $1/F_{Limit}$ between the signals of the individual pixels of these first and second series. After an analog-to-digital conversion, this second pulse series can be read-in and further processed in the intermediate register 22 separated in time from the first pulse series. Separate serial or parallel processing of all received signals can only take place in the conventional manner. In this case, the readout rate of the receiver is at least $M/F_{Measurement}$.

In the past years, lasers have been developed which are very well suited for serving as transmission lasers for the laser transmitter 12. These are preferably fiber lasers or master-oscillator-amplifier combinations, preferably with fiber-optical amplifiers having a higher pulse frequency allowing in an efficient manner to obtain an advantageous average beam power in the range of hundreds of Watts. One example is the glass fiber laser or glass fiber amplifier doped with ytterbium, Yb, with amplifying wave lengths between 1030 nm and 1080 nm, or doped with erbium with amplifying wave lengths of about 1.5 μm. An additional advantage of these fiber-lasers and amplifiers over former crystal lasers and crystal amplifiers is their compact integral construction. Due to connections of the subsystems to light guides, the usual common optical bench of all optical components and subsystems of a LIDAR which impedes operation thereof in a satellite, may be omitted.

A rather attractive system architecture for the laser transmitter 12 is the design of frequency-stable and easy modulating master oscillators 24 with a fiber pre-amplifier 26 and a fiber final amplifier 28, a so-called MOPA 30 (master-oscillator power amplifier) for generating the pulsed radiation with a low spectral bandwidth. A low spectral bandwidth of the transmission radiation is advantageous both for measurements of the intensity of the atmospheric backscattering and of the wind force by means of Doppler LIDARs; in the first case for separating frequency-shifted pulses in pulse series and in the second case for obtaining the required Doppler measurement resolution in the frequency range.

Here, a diode laser or micro solid-state laser of suitable wavelength in the IR in the low power range can be used for providing a pulsed emission of a low spectral bandwidth and high radiation quality which are both substantially maintained during a subsequent amplification. The good radiation quality obtained after amplification by means of fiber amplifiers 26, 28 is advantageous for a possible further frequency multiplication of the original infrared wave length to obtain the UV wave length preferred for atmospheric LIDARs.

An important step forward in the art has been made in recent years in the field of photo receivers and signal evaluation techniques and makes it possible to measure the very weak backscattering signals of individual pulses from the earth atmosphere. This applies to both different techniques as used today in LIDAR and based on the one hand on the property of light as a particle stream, i.e., direct reception involving intensity detection or single photon count, and on a wave action through coherence reception involving signal superimposition on the other hand Advantageous embodiments of the receiving device 14 and of a signal evaluation device 32 utilize the progress of at least one of these two technologies.

Embodiments for direct reception as shown, for example, in the FIGS. 3 through 8, use a photo detector 34 with high signal dynamics in the reception channel—receiver 13, the photo detector 34 being capable of detecting individual photon events in the reception signal of the broadband Rayleigh and the narrowband Mie scattering and of counting up to a high rate or integrating in analogous manner. In a heterodyne reception mode (one example is shown in FIG. 9), which is primarily suitable for detecting narrowband Mie scattering, the backscattering signal of the pulsed laser from the atmosphere is superimposed with the optical signal of a local oscillator, briefly LO, on the photo detector 34, which signal is shifted with a frequency that is fixed compared to the frequency of the transmission beam (heterodyne reception). From the optical interference there is produced the frequency difference in the photo detector 34 which now carries the useful signal of the backscatter from the atmosphere in the low radio frequency range. This signal is a low-noise signal and can be very easily processed electronically.

In configurations of the LIDAR arrangement 10 and of the LIDAR method, the frequency coding task is solved and the separation of the optical signals achieved in that in the direct reception (as shown, for example, in FIGS. 3 through 8) on the transmission side of the LIDAR arrangement 10 the optical frequency of the pulses along the transmission pulse series is successively shifted by a small amount. Upon reception, the dispersive element 16 is added to spatially separate the frequency of the received signals before these signals meet a matrix sensor 36, in particular the photo detector array 36—which may happen in some circumstances also via an optional wave length analyzer for differentiating minor frequency shifts of the laser signal in the measurement medium (e.g., Doppler shift)—in order to assign the signals to the related transmission pulses.

In configurations for coherence reception (as shown, for example, in FIG. 9), the optical frequency is also shifted, whereas the optical frequency of the continuous wave emission of the LO is held. Accordingly, the intermediate frequency of the backscatter of each pulse at the photo detector 34 is different after the superimposition of the two and can be separated by electronic filtering or Fourier analysis.

As these two configurations of the LIDAR arrangement 10 work in two different ways, the same will also be described separately in the following.

First of all, possible constructions for the direct reception technology are described in detail with reference to the illustrations of the FIGS. 3 through 8. In the following there will be particularly discussed the signal unbundling in relation to the direct reception technique.

In a preferred embodiment of the LIDAR arrangement 10 there is provided that the entire laser transmitter 12 is composed of an oscillator 24, a pre-amplifier 26 and a final amplifier 28 (master oscillator power amplifier, MOPA 30) comprising an optional frequency multiplication device 38 for a subsequent frequency multiplication. Further, the embodiments of the LIDAR arrangement 10 and the LIDAR method provide that the frequency shift proposed here is carried out in the oscillator stage in a distributed reflection bragg (DRB) laser diode or in a micro crystal laser resonator. The amplification of each frequency-shifted signal then takes place in subsequent one or two-fiber amplifiers followed by an optional frequency multiplication up to the target power in a stage suitable therefor.

For the fast shifting of the transmission frequency from pulse to pulse, embodiments of the LIDAR arrangement 10 and of the LIDAR method first provide a fast direct shift of the optical frequency of the oscillator 24 or the use of several chronologically pulsed lasers L1, L2, L3 . . . LM of different fixed emission wave lengths. There can be used, for example, several laser diodes of emission wave lengths in the range of fiber amplification (in the range of about 1.5 µm or other wave length ranges), for example corresponding to the frequency spacing used in fibers in frequency division multiplexing, which offers the advantage that the usual dispersive elements in the field of fiber optics common for WDM can be used on the receiving side.

A second method is the direct change of the resonator frequency of the laser resonator by a stepwise shift of the optical spacing of the resonator mirrors. This method is particularly attractive for short resonators with a broad frequency spacing of the longitudinal modes, i.e., of a micro laser. Because here only one mode is within the amplification band width, which is 180 GHz or 0.3 nm in a Nd:YAG material, for example, and has a similar width in semiconductor diodes. The change of the emission frequency, i.e., of the optical spacing of the final mirrors in the resonator, can then be made for both kinds of the laser with fast temperature changes of the semiconductor material by introducing stress via a piezoelectric element, for example, or by moving an external resonator mirror with piezoelectric elements, for example.

A third method of frequency modulation of a laser is the use of an internal or external electro-optical or acousto-optical modulator.

As discussed above, it is proposed to design M pulses in such a manner that their optical frequency is different by a particular amount AG, wherein M is chosen such that: $M/F_{Measurement} \geq 1/F_{Limit}$ in order to avoid ambiguity at the reception. Hence the entire frequency deviation $\Delta f_p$ passed through in each period on the transmission side is $\Delta f_p = M \Delta f_n$. This frequency deviation $\Delta f_p$ is chosen such that it lies within the frequency band width of the band width of the fiber amplifier 26, 28 on the transmission side of the LIDAR. On the receiving side, $\Delta f_n$ is predetermined such that it is sufficiently large to be resolved if necessary together with the Doppler frequency shift by the dispersive element 16.

In the first case, embodiments of the LIDAR arrangement 10 and the LIDAR method provide that after the reception of signal backscattered from the atmosphere with a telescope, the pulses of different wave length are supplied separated in space to a detector array by means of a dispersive element 16, e.g., a prism, a grating or a fiber-optical de-multiplexer, a reconfigurable de-multiplexer or an arrayed waveguide grating, and are then optionally coupled under different angles and/or different positions into an interferometer 18 such as a Fabry-Pérot interferometer or alternatively a Fizeau interferometer, if small frequency shifts of the received LIDAR signal such as a Doppler shift shall be measured, so that at the output of the interferometer several ring systems (interferograms) are produced at least partially separated in space so that the individual backscattering pulses can also be separated in space and analyzed. In this case, there is performed, so to speak, a first rough separation of the individual reception signals depending on the wave length of the transmission pulses by means of a dispersive element 16 and a further separation and analysis of these signals (optionally along with the Doppler shift with respect to each of the pulses of different wave length) with the aid of the interferometer 18. In this process, the optical signals of the interferograms are converted into electrical signals using a 1D or 2D matrix sensor 36.

Embodiments of the LIDAR arrangement 10 and the LIDAR method additionally provide that, if needed, a small portion of the radiation of the laser transmitter 12 is directly supplied to the dispersive element 16 as a frequency or wave length reference for the Doppler-shifted signals by means of a switch in order to serve as a reference signal. In the Figures, this switch is shown as a part of a reference signal line 19.

Figure 3:
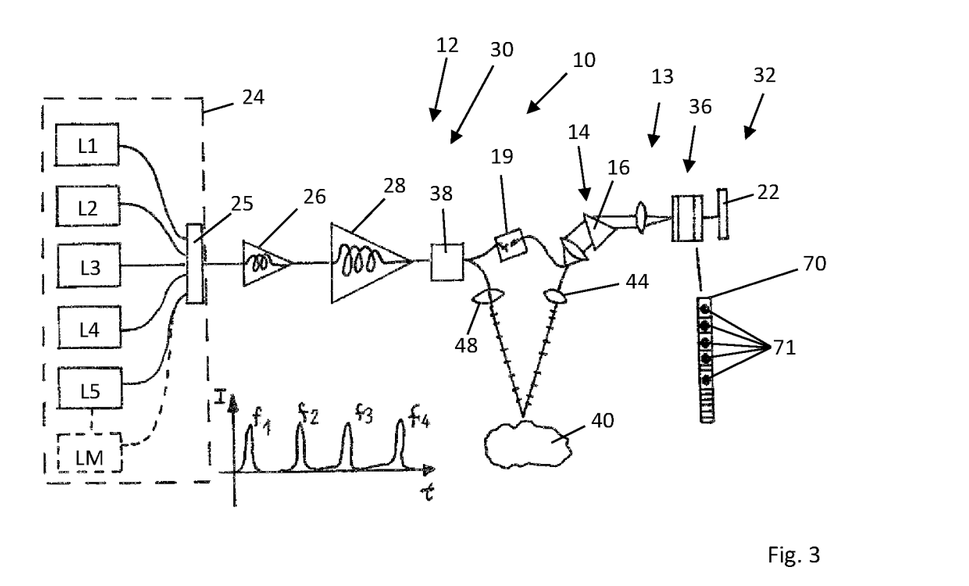
FIG. 3 shows a schematic overview of a first embodiment of a LIDAR arrangement.
Figure 4:
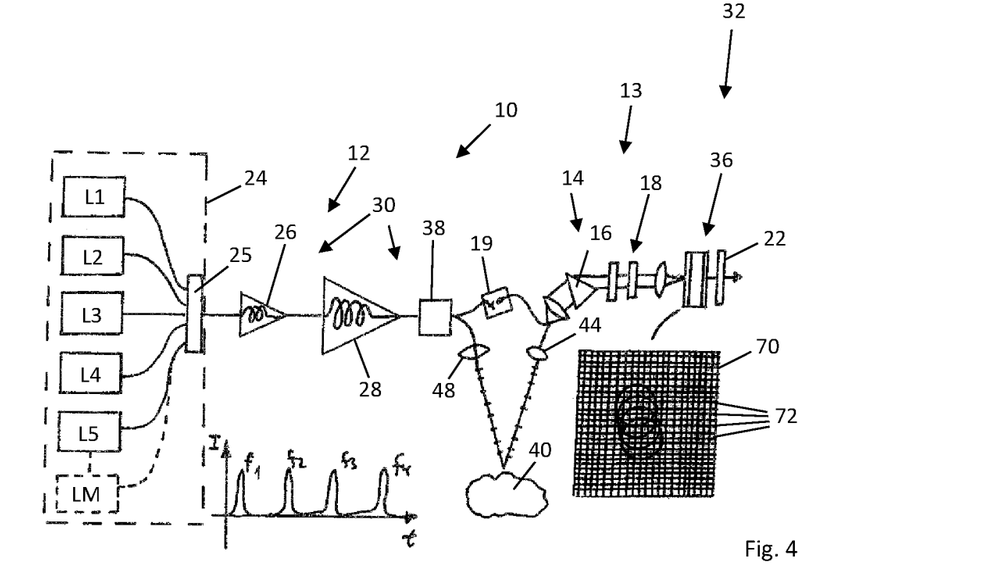
FIG. 4 shows a schematic overview of a second embodiment of a LIDAR arrangement.

Two embodiments of the LIDAR arrangement 10 for these tasks are schematically represented in FIG. 3 and FIG. 4. Both Figures show on the left side thereof the master oscillator 24 that can be switched in several frequency steps and comprises several lasers L1, L2, . . . LM emitting a pulse series $f_1, f_2, \ldots f_m$ of a suitable pulse frequency and comprising a suitable frequency shift between the individual pulses, and a beam combiner 25 for coupling the outputs of the lasers L1, L2, . . . LM to a common output (especially fiber). Further, embodiments of the LIDAR arrangement 10 show a pre-amplifier 26 and a post-amplifier 28 (booster) for amplifying the pulse energy at the primary wave length, which mostly is in the IR wave length range, and an optional frequency multiplying device 38 for an optional frequency tripling up to the UV wave length range. Further shown in FIG. 3 and FIG. 4 is the emission of the pulse series to a remote soft target 40—one example of a measurement object—and the reception thereof by the receiver 13.

FIG. 3 shows an embodiment of the LIDAR arrangement 10 designed as a backscatter LIDAR arrangement for the direct reception comprising a series-switchable laser array as a master oscillator 24 and comprising downstream fiber amplifiers 26, 28, an optional frequency multiplier 38 on the transmission side, and a dispersive element 16 for resolving the reception signal into a point spectrum, and a 1D matrix sensor 36 (especially a matrix sensor comprising an A/D converter) (and an intermediate register 22) on the receiving side.

FIG. 4 shows an embodiment of the LIDAR arrangement 10 designed as a Doppler LIDAR arrangement for direct reception and comprising a series of lasers L1, L2, . . . LM including a beam combiner 25 as a master oscillator 24, fiber amplifiers 26, 28, optional frequency multipliers 38, a dispersive element 16, a Fabry-Pérot interferometer frequency analyzer 42 comprising an interferometer designed as a Fabry-Pérot interferometer, a 2D matrix detector with an A/D converter—one further example of the matrix sensor 36—and an intermediate register 22 for recording the measurement data 70.

Both embodiments of the arrangement according to FIG. 3 and FIG. 4 are different from each other with regard to the spectral resolution, i.e., whether the LIDAR is a pure backscattering LIDAR or a Doppler LIDAR. In both cases, the backscattering signal is received by means of reception electrodes 44 and is transmitted to the dispersive element 16, i.e., in the present case to a prism or to a different one of the aforementioned dispersive elements, for a rough separation of the reception signals of the individual transmission frequencies. In a backscattering LIDAR, in which the signals are only separated by frequency, the reception signals can then be recorded at this point as point spectra 71 of the laser sources using a linear 1D photo detector array 36 as shown in FIG. 3.

For a finer frequency separation, such as in the Doppler LIDAR, a Fabry-Pérot interferometer is used as a frequency analyzer, for example, with subsequent imaging of its interferograms on a suitable 2D matrix detector 36 as shown in FIG. 4.

The free spectral range of the Fabry-Pérot interferometer (FPI) is $\Delta f_{FP} = c/2L_{FP}$, wherein LFP describes the plate spacing of the interferometer 18. Accordingly, the free spectral range at a plate spacing of $L_{FP}=75$ mm is $\Delta f_{FP}=2$ GHz, for example. This is set in such a manner that it is sufficient for covering at least the greatest Doppler frequency shift in the Doppler LIDAR plus M times the frequency shift.

Avalanche CMOS or CDD photo detector arrays and MCP (multichannel plates) image intensifiers, for example, are suitable as a linear photo detector 34 or matrix photo detector (matrix sensor 36) for the single photon detection.

Figure 5:
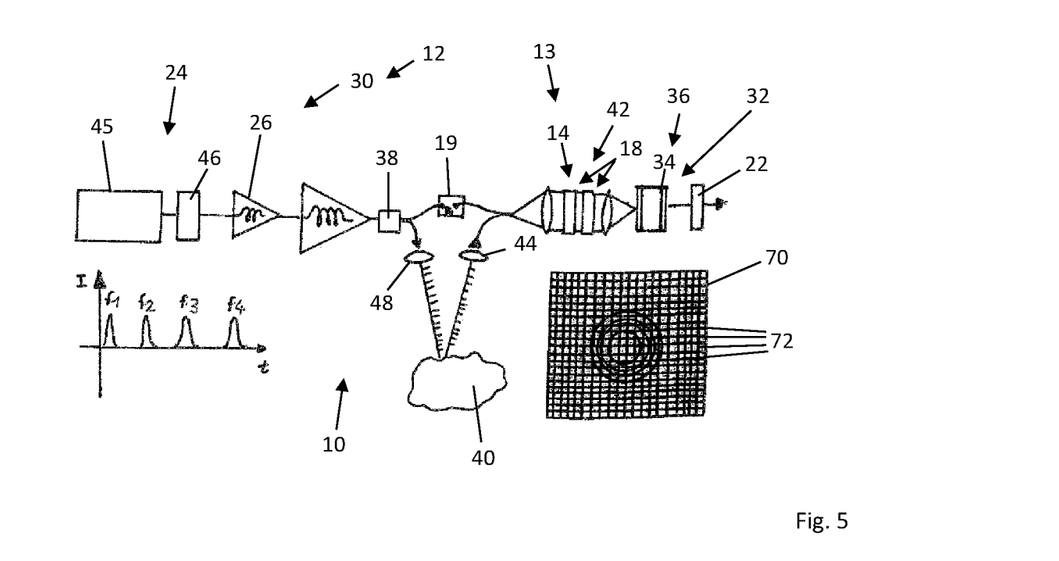
FIG. 5 shows a schematic overview of a third embodiment of a LIDAR arrangement.

In embodiments of the LIDAR arrangement 10 and of the LIDAR method, the point spectra 71 and interferograms 72 are charged side by side over a fixed time interval after the photo detector 34, 36 and after an analog-to-digital conversion and can then be read out in parallel at a considerably lower frequency than the pulse frequency used, and their further signal processing involving electronic processing can be performed in the conventional manner A further possible embodiment of the LIDAR arrangement 10 is shown in FIG. 5. In this case, it is assumed that a single master laser 45 is used as a master oscillator 24 with a switchable modulator 46 for producing the optical frequency series previously described.

FIG. 5 shows as a signal on the matrix detector array 36 an image of concentrated interference rings 72, which are either generated using a single interferometer 18 as previously described or an arrangement of two successive interferometers as a so-called tandem interferometer 42 with a different free spectral range and/or frequency, hence a new variant of frequency separation and analysis for both a backscattering and Doppler LIDAR.

Such a tandem interferometer 42 comprises, for instance, two serial FP interferometers with a different plate spacing: one with a short plate spacing in order to achieve a longer overall free spectral range at a spectral resolution of the second FP interferometer with the larger plate spacing. In this case, the first Fabry-Pérot interferometer with a large free spectral range takes over the role of the dispersive element 16. Other than in the previous case, the interferometers 72 are not laterally offset, but are concentrically arranged so that a different ring radius corresponds to a different frequency of each laser pulse. In this case, the second Fabry-Pérot interferometer again serves for the measurement of a Doppler shift that may be required.

FIG. 5 shows a single laser 12 as a master oscillator 24 comprising an external frequency modulator 46, fiber amplifiers 26, 28, a tandem Fabry-Pérot interferometer 18, a matrix sensor 36 including an A/D converter, and an intermediate register 22 for recording the measurement data. In this case, the interferograms 72 are individual concentric ring systems with a radial distance of the free spectral range of the FPI corresponding to the small plate spacing that covers the whole range of the Doppler shift to be measured. Other combinations are also possible.

Besides a prism as shown in FIG. 3 and FIG. 4 and an FPI as shown in FIG. 5, also a "fiber-optical de-multiplexer (OADM)," a "reconfigurable fiber-optical de-multiplexer (ROADM)" or an "arrayed waveguide grating (AWF)" can be used as a dispersive element 16.

Figure 6:
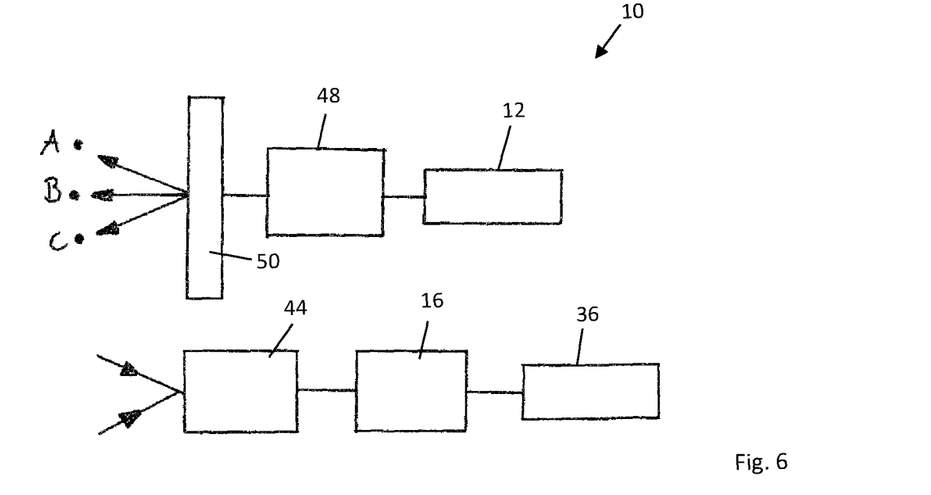
FIG. 6 shows a schematic overview of a transmission part and a receiving part of a fourth embodiment of the LIDAR arrangement.

Some embodiments of the LIDAR arrangement 10 and of the LIDAR method further provide scanning of the measurement object for instance transversely to the moving direction of an aircraft or satellite using a scanner 50 upstream of transmission telescope 48 over discrete angular positions within a small angular range and receiving the backscatter by means of a receive telescope 44 that covers the whole angle transmission range as shown in FIG. 6.

FIG. 6 shows the scanning of a small angular range with the transmission beam in discrete steps (A, B, C) and the receipt of the backscatter within the fixed same angular range of a receive telescope 44.

Figure 7:
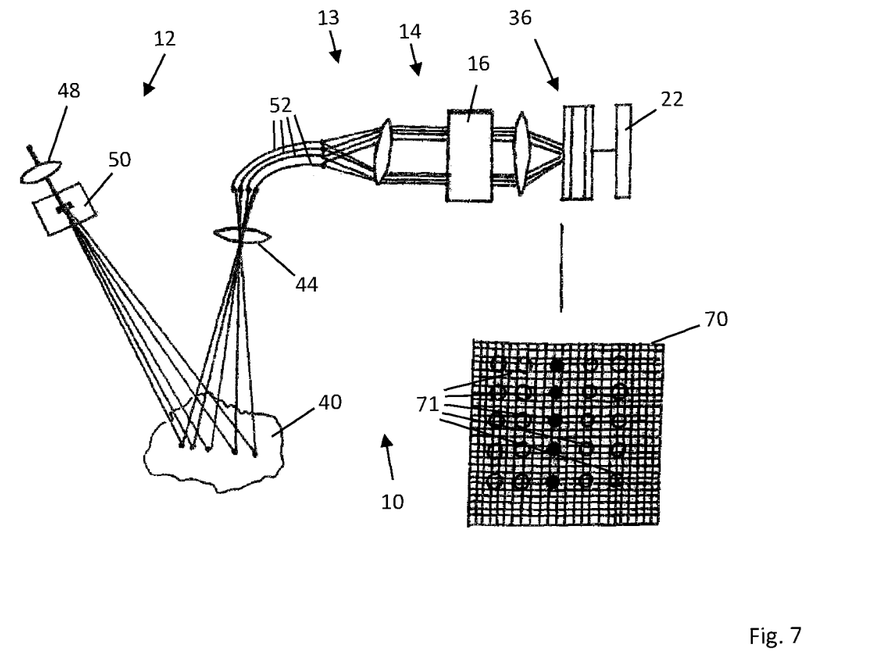
FIG. 7 shows a schematic overview of a fifth embodiment of a LIDAR arrangement.
Figure 8:
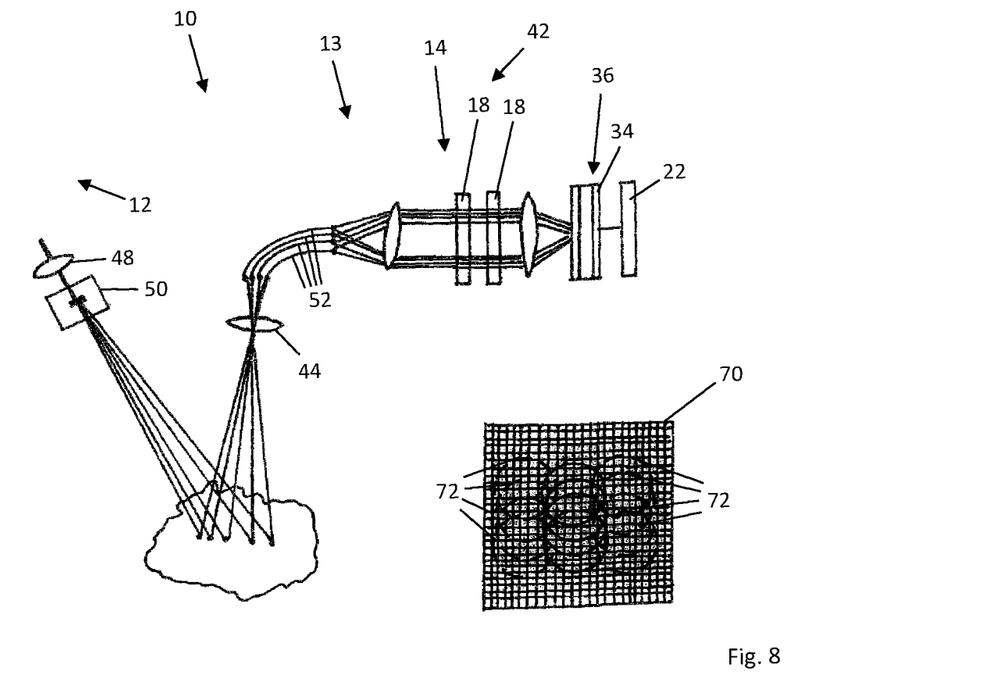
FIG. 8 shows a schematic overview of a sixth embodiment of a LIDAR arrangement.
Figure 9:
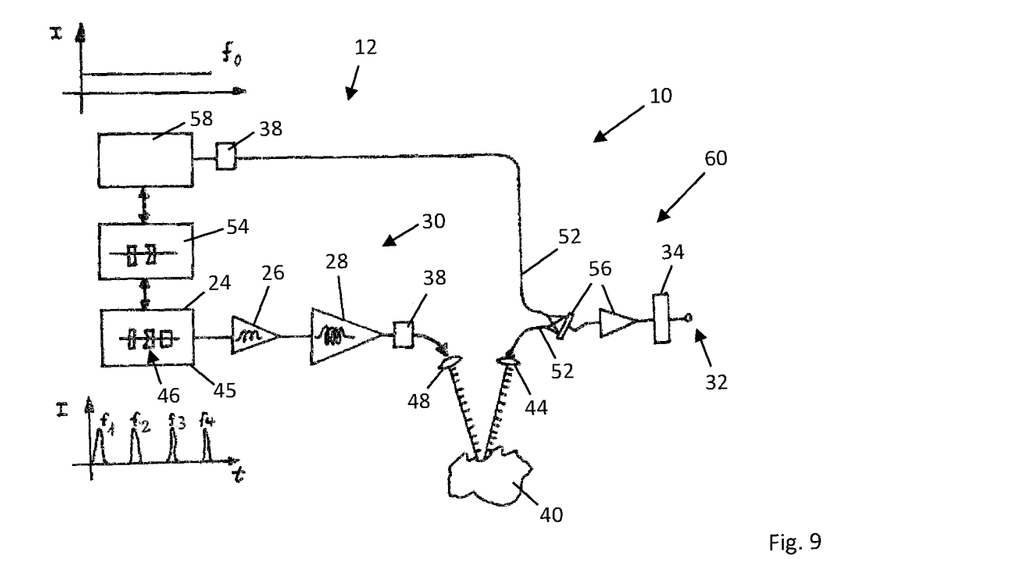
FIG. 9 shows a schematic overview of a seventh embodiment of a LIDAR arrangement.

In this case, the different receiving axes within the FOV (field of view) of the receive telescope 44 can be defined by an array of glass fibers 52 in its focal plane as this is shown in more detail in FIG. 7 and FIG. 8.

FIG. 7 shows the forwarding of the backscattering signals from several directions by means of glass fibers 52, for a separation by means of a dispersive element 16 (e.g., prism) and the mapping as parallel rows of the measurements from different directions and with different transmission frequencies.

FIG. 7 accordingly shows a first case analogous to the arrangement shown in FIG. 3, but with the receiving fiber array arranged perpendicular to the plane of refraction of the prism as the dispersive element 16. In this case, the dot patterns 71 of the different transmission frequencies would be mapped on the photo detector array (matrix sensor 36) in parallel rows of the different directions—see reference number 70.

FIG. 8 shows a second case indicating an analogous extension of the functions of the arrangements of FIG. 4 and FIG. 5, wherein the arrangement according to FIG. 4 uses a Fabry-Pérot interferometer 18 after a prism. According to FIG. 8, the signal from the various receiving directions can be separately mapped on the photo detector array 36 as parallel rows of interferograms 71—shown at 70, read separately into the intermediate register 22 and then further processed in the conventional manner.

FIG. 8 shows the forwarding of backscattering signals from several directions by means of glass fibers 52, for the common separation by means of a Fabry-Pérot interferometer 18 and the mapping as parallel rows 71 of the measurements from various directions and with various transmission frequencies.

In the following, possible embodiments of the LIDAR arrangement 10 and of the LIDAR method for using the technique of heterodyne reception will be discussed in more detail with reference to FIG. 9, particularly the signal unbundling in relation to the heterodyne reception.

The technique of heterodyne reception is based on the narrow frequency coupling of the transmitter and of a local oscillator 58—LO. The coupling of the two oscillators of the LO 58 and the pulsed master oscillator 24 of the laser transmitter 12 can be established for instance via a reference oscillator 54, e.g., via a common optical resonator as shown in FIG. 9.

FIG. 9 shows a transmission and receiving unit of one embodiment of a LIDAR arrangement 10 for heterodyne reception, comprising a master oscillator 24 tunable by means of an electro-optical modulator 46, amplifiers 26, 28, an optical frequency multiplier 38 and a superimposition device 56 for the optical superimposition of the reception signal and of the signal of the LO (local oscillator 58) on a photo detector 34 and for electronic further processing of the differential signal. For example, in this case, a frequency analyzer 60 for the separation of the received pulses according to their frequency shift is formed.

In this case, the optical frequency of the LO 58, the laser emission thereof is operated in a continuous wave, is coupled in a known manner to that of the reference oscillator 54, and is then optionally multiplied in frequency in the same manner as the laser transmitter 12. On the other hand, the optical base frequency of the pulsed base oscillator 24 is held at this frequency, but its pulse radiation is successively shifted in fixed steps $f_1$, $f_2$, $f_3$, . . . $f_m$ using an external modulator.

After the reception of the backscattering light by means of a receive telescope 44, the backscattering light is superimposed with the light of the local oscillator 58 on the photo detector 34 with the aid of glass fibers 52. The frequency mixed signal of the photo detector 34 then has the intermediate frequency of each individual transmission pulse of the LO 58 in the radio range impregnated with the modulation by atmospheric backscattering. This signal can then be further processed electronically in the conventional manner. Similar to direct reception, the frequency shift of the transmission pulse then allows an unambiguous assignment of the reception signals to the transmission pulses.

Also, similar to the direct reception of signals from various transmission directions—as describe above—the optical signals of the receive telescope 44 and of the local oscillator 58 can be superimposed with a series of glass fibers on the photo detector 34 by means of glass fibers 52 and thus be successively processed further using the same electronic device.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMBERS

10 LIDAR arrangement
12 laser transmitter
13 receiver
14 optical reception device
16 dispersive element
18 interferometer element
19 reference signal line (e.g., with switch)
22 intermediate register
24 master oscillator
25 beam combiner
26 pre-amplifier (fiber pre-amplifier)
28 final amplifier (fiber final amplifier)
30 MOPA
32 signal and evaluation device
34 photo detector
36 matrix sensor
38 frequency multiplication device
40 soft target
42 Fabry-Pérot interferometer frequency analyzer (composed, for example, of two interferometer elements 18 or other elements)
44 receive telescope
45 master laser
46 modulator
48 transmission telescope
50 scanner
52 glass fiber
54 optical resonator
56 superimposition device 58 local oscillator
60 frequency analyzer
70 intensity image of the reception signals on the matrix sensor
71 one example of individual spatially separated reception signals on the detector 36
72 one example of individual spatially separated interferograms on the detector 36
L1, L2, L3, . . . LM laser

The invention claimed is:

1. A LIDAR arrangement configured for atmospheric measurements, comprising:
   a laser transmitter for transmitting individual pulses of a laser radiation to a measurement object, and
   a receiver for receiving the individual pulses of the laser radiation backscattered from the measurement object,
   wherein the laser transmitter is configured to transmit a pulse series in which successive pulses respectively comprise an optical frequency shift to each other, and wherein the receiver
      includes a dispersive element for spatially separating the pulses depending on the optical frequency by a frequency-dependent deflection, and a matrix sensor on which the pulses spatially separated by the dispersive element are mapped, and, between the dispersive element and the matrix sensor, the receiver comprises an interferometer configured for mapping at least partially spatially separated interferograms to the individual pulses of the pulse sequence on the matrix sensor.

2. The LIDAR arrangement according to claim 1, wherein the laser transmitter is configured to transmit pulses with a pulse frequency of 1 kHz to 1 MHz.

3. The LIDAR arrangement according to claim 1, wherein the laser transmitter, at least one of
   includes a master oscillator including a plurality of lasers, a master laser that is directly modulatable in its wave length, or a combination of a master laser and a downstream modulator for modulating a wave length of the master laser,
   includes at least one of at least one fiber laser and several optical amplifiers for amplifying a signal of the master oscillator, wherein the several optical amplifiers are selected from a group consisting of fiber lasers, fiber pre-amplifiers and fiber post-amplifiers,
   includes a frequency multiplier downstream of the amplifier or of the fiber laser,
   includes a transmission telescope, and
   includes a scanner for scanning an angular range with radiation from the laser transmitter.

4. The LIDAR arrangement according to claim 1, wherein at least one of
   the dispersive element includes one or more elements from the group consisting of a grating, a prism, a Fabry-Pérot interferometer, a fiber-optical de-multiplexer, a reconfigurable fiber-optical multiplexer, and an arrayed waveguide grating,
   the matrix sensor is chosen from the group consisting of a one-dimensional matrix sensor, a two-dimensional matrix sensor, a photo detector array, a one-dimensional photo detector array, a two-dimensional photo detector array, a CCD array, a one-dimensional CCD array, a two-dimensional CCD array, a PIN detector array, a one-dimensional PIN detector array, a two-dimensional PIN detector array, a CMOS array, a one-dimensional CMOS array, a two-dimensional CMOS array, a CMOS APD array, a one-dimensional CMOS APD array, a two-dimensional CMOS APD array, an ICCD detector, a one-dimensional ICCD detector, a two-dimensional ICCD detector, an EMCCD array, a one-dimensional EMCCD array, a two-dimensional EMCCD array, an IBCCD array, a one-dimensional IBCCD array, a two-dimensional IBCCD array, an EMCMOS array, a one-dimensional EMCMOS array, a two-dimensional EMCMOS array, an IBCMOS array, a one-dimensional IBCMOS array, and a two-dimensional IBCMOS array, and
   the frequency analyzer comprises a photo detector and a device for the superimposition of received radiation with a reference radiation on the photo detector, wherein the photo detector is configured for outputting a signal having a differential frequency corresponding to a difference between the frequencies of received radiation and a reference radiation.

5. The LIDAR arrangement according to claim 1, wherein at least one of
   the receiver comprises an interferometer for recording the spatially separated signal at least one of at different positions and under different angles, so that at an output of the interferometer at least partially separated interferograms to the individual separated frequency-shifted pulses are created which can be recorded by means of a one or two-dimensional photo detector array,
   the receiver is a Fabry-Pérot interferometer or a Fizeau interferometer for recording the spatially divided signal and for producing at least partially spatially separated interferograms to the individual pulses, and
   a coupling device for coupling the spatially separated pulses into the dispersive element in an arrangement of a line, a circle or any other two-dimensional arrangement of light rays.

6. The LIDAR arrangement according to claim 1, wherein the receiver comprises at least one of
   an A/D converter for the conversion of signals from pixels of the matrix sensor, and
   an intermediate register for storing signals from pixels of the matrix sensor.

7. The LIDAR arrangement according to claim 1, wherein the receiver comprises at least one of
   a receive telescope, and
   a light guide device for receiving radiation from different directions from the measurement object and for introduction into the dispersive element from different directions in different angles or at spatially displaced locations.

8. The LIDAR arrangement according to claim 1, wherein the laser transmitter includes
   a master oscillator selected from a group consisting of a master oscillator including a plurality of lasers, a plurality of diode lasers of different wave length, a master laser that is directly modulatable in its wave length, a combination of a master laser and a downstream modulator for modulating a wave length of the master laser,
   at least one of at least one fiber laser and several optical amplifiers for amplifying a signal of the master oscillator, wherein the several optical amplifiers are selected from a group consisting of fiber lasers, fiber pre-amplifiers and fiber post-amplifiers,
   a frequency multiplier downstream of the amplifier or of the fiber laser,
   a transmission telescope, and
   a scanner for scanning an angular range with a radiation from the laser transmitter.

9. The LIDAR arrangement according to claim 1, wherein
the dispersive element includes one or more elements from the group consisting of a grating, a prism, a Fabry-Pérot interferometer, a fiber-optical de-multiplexer, a reconfigurable fiber-optical multiplexer, and an arrayed waveguide grating,
the matrix sensor is chosen from the group consisting of a one-dimensional matrix sensor, a two-dimensional matrix sensor, a photo detector array, a one-dimensional photo detector array, a two-dimensional photo detector array, a CCD array, a one-dimensional CCD array, a two-dimensional CCD array, a PIN detector array, a one-dimensional PIN detector array, a two-dimensional PIN detector array, a CMOS array, a one-dimensional CMOS array, a two-dimensional CMOS array, a CMOS APD array, a one-dimensional CMOS APD array, a two-dimensional CMOS APD array, an ICCD detector, a one-dimensional ICCD detector, a two-dimensional ICCD detector, an EMCCD array, a one-dimensional EMCCD array, a two-dimensional EMCCD array, an IBCCD array, a one-dimensional IBCCD array, a two-dimensional IBCCD array, an EMCMOS array, a one-dimensional EMCMOS array, a two-dimensional EMCMOS array, an IBCMOS array, a one-dimensional IBCMOS array, and a two-dimensional IBCMOS array, and
the frequency analyzer comprises a photo detector and a device for the superimposition of the received radiation with a reference radiation on the photo detector, wherein the photo detector is configured for outputting a signal having a differential frequency corresponding to a difference between the frequencies of received radiation and a reference radiation.

10. The LIDAR arrangement according to claim 1, wherein
the receiver comprises an interferometer for recording the spatially separated signal at least one of at different positions and under different angles, so that at an output of the interferometer at least partially separated interferograms to the individual separated frequency-shifted pulses are created which can be recorded by means of a one or two-dimensional photo detector array, and
a coupling device for coupling the spatially separated pulses into the dispersive element in an arrangement of a line, a circle or any other two-dimensional arrangement of light rays.

11. The LIDAR arrangement according to claim 1, wherein the receiver comprises
an A/D converter for the conversion of signals from pixels of the matrix sensor, and,
an intermediate register for storing signals from pixels of the matrix sensor.

12. The LIDAR arrangement according to claim 1, wherein the receiver comprises
a receive telescope, and
a light guide device for receiving radiation from different directions from the measurement object and for introduction into the dispersive element from different directions in different angles or at spatially displaced locations.

13. A LIDAR method for atmospheric measurement for measuring a location and a speed of a soft target, comprising:
emitting a series of pulses of a laser radiation to the soft target, wherein successive pulses respectively comprise a particular frequency shift to each other,
receiving pulses backscattered from the soft target, and
spatially dividing the pulses depending on their optical frequency with a dispersive element and corresponding spatially separated mapping on a matrix sensor and detecting a mapping position of the received pulses on the matrix sensor, wherein at least partially locally separated interferograms are produced according to their frequency by means of an interferometer and are mapped on the matrix sensor.

14. The LIDAR method according to claim 13, wherein the pulses are emitted at a pulse frequency of 1 kHz to 1 MHz.

15. The LIDAR method according to claim 13, wherein the pulses of different frequency are generated in a master oscillator and thereafter are amplified by means of at least one fiber amplifier.

16. The LIDAR method according to claim 15, wherein the pulses, after their amplification, are converted in their optical frequency and multiplied in optical frequency by means of nonlinear media.

17. The LIDAR method according to claim 13, further including at least one of
supplying the spatially divided pulses to an interferometer at different positions or under different angles so that at an output thereof at least partially separate interferograms to the individual spatially separated frequency-shifted pulses are formed which are recorded by means of a one or two-dimensional photo detector array,
supplying the spatially divided pulses to a Fabry-Pérot interferometer or to a Fizeau interferometer to produce at least partially separated interferograms to the individual pulses, and
coupling the spatially separated pulses into the dispersive element in an arrangement of a line, a circle or any other two-dimensional arrangement of light rays.

18. The LIDAR method according to claim 13, further including scanning of the emitted pulses over an angular range and receiving the backscattered pulses within an angular range and spatially separated mapping of pulses received from different angles on the matrix sensor.

19. The LIDAR method according to claim 13, wherein the step of receiving pulses backscattered from the measurement object comprises the superimposition of the received pulses with a reference radiation and further processing of the differential frequency.

* * * * *